US008659925B2

(12) United States Patent  (10) Patent No.: US 8,659,925 B2
Sagona  (45) Date of Patent: Feb. 25, 2014

(54) THREE-LEVEL ACTIVE RECTIFICATION PULSE WIDTH MODULATION CONTROL

(75) Inventor: John Duward Sagona, Poplar Grove, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 391 days.

(21) Appl. No.: 12/910,205

(22) Filed: Oct. 22, 2010

(65) Prior Publication Data

US 2012/0099349 A1   Apr. 26, 2012

(51) Int. Cl.
  *H02M 7/217* (2006.01)
(52) U.S. Cl.
  USPC ............................................. 363/127
(58) Field of Classification Search
  USPC ................. 363/52, 53, 84, 89, 125, 127
  See application file for complete search history.

(56) References Cited

U.S. PATENT DOCUMENTS

| | | | |
|---|---|---|---|
| 4,030,016 A | 6/1977 | Marriott | |
| 5,574,636 A * | 11/1996 | Lee et al. | 363/132 |
| 6,198,613 B1 | 3/2001 | Rozman | |
| 6,333,569 B1 | 12/2001 | Kim | |
| 6,421,262 B1 | 7/2002 | Saxelby et al. | |
| 7,269,039 B2 | 9/2007 | Cheng | |
| 7,400,065 B2 | 7/2008 | Michalko | |
| 7,495,938 B2 * | 2/2009 | Wu et al. | 363/40 |
| 7,615,881 B2 | 11/2009 | Halsey et al. | |
| 7,746,024 B2 | 6/2010 | Rozman et al. | |
| 8,279,647 B2 * | 10/2012 | Jin et al. | 363/89 |
| 2006/0151874 A1 | 7/2006 | Milich et al. | |
| 2007/0014374 A1 | 1/2007 | Hershbarger | |
| 2007/0109824 A1 | 5/2007 | Romenesko | |
| 2008/0013352 A1 | 1/2008 | Baker | |
| 2012/0092914 A1 * | 4/2012 | Viitanen | 363/126 |
| 2013/0063070 A1 * | 3/2013 | Zhang et al. | 318/729 |

FOREIGN PATENT DOCUMENTS

DE  19650994 C1   6/1998
WO    0103490 A2   1/2001

OTHER PUBLICATIONS

Carrara, G. et al.; "A New Multilevel PWM Method: A Theoretical Analysis", Power Electronics Specialists Conference, 1990, 21st Annual IEEE; p. 363-371; Jan. 1, 1990.
European Search Report dated Nov. 21, 2012 for Application No. 11191830.6-1228.

* cited by examiner

*Primary Examiner* — Matthew Nguyen
(74) *Attorney, Agent, or Firm* — Cantor Colburn LLP (57) ABSTRACT

An active rectification system includes a three-level active rectifier and a pulse with modulation (PWM) control portion. The three-level active rectifier includes at least three switches, the at least three switches are selectively switchable between an upper state, a center state, and a lower state. The PWM control portion is in communication with the at least three switches, the PWM control portion is configured and disposed to create an upper carrier signal and a lower carrier signal, and the PWM control portion is configured and disposed to selectively switch the at least three switches between the upper state, the center state, and the lower state in response to a phase disposition of the upper carrier signal and the lower carrier signal.

19 Claims, 8 Drawing Sheets

FIG. 8 ative rectification system, according to an example embodiment;

THREE-LEVEL ACTIVE RECTIFICATION PULSE WIDTH MODULATION CONTROL

FIELD OF INVENTION

The subject matter disclosed herein relates generally to the field of active rectification, and more particularly to pulse width modulation (PWM) control of three-level active rectifiers.

DESCRIPTION OF RELATED ART

Generally, boost inductors in line with input voltages to active rectifiers are relatively large, resulting in increased weight. Furthermore, depending upon a voltage across the boost inductors, a size of the active rectifier may increase to facilitate the relatively large boost inductors. It follows that in situations where reduced weight or limited weight is desirable, for example in aircraft, reducing the size of the boost inductors and active rectifiers may be beneficial.

BRIEF SUMMARY

According to one aspect of the invention, an active rectification system includes a three-level active rectifier and a pulse with modulation (PWM) control portion. The three-level active rectifier includes at least three switches, the at least three switches are selectively switchable between an upper state, a center state, and a lower state. The PWM control portion is in communication with the at least three switches, the PWM control portion is configured and disposed to create an upper carrier signal and a lower carrier signal, and the PWM control portion is configured and disposed to selectively switch the at least three switches between the upper state, the center state, and the lower state in response to a phase disposition of the upper carrier signal and the lower carrier signal.

According to another aspect of the invention, a method of three-level active rectification pulse width modulation (PWM) control is provided. The method includes receiving a reference voltage, comparing the reference voltage to a phase disposition of an upper carrier signal and a lower carrier signal of a PWM scheme, and selecting between at least three switch states of a three-level active rectifier in response to the comparison.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods of three-level active rectification PWM control are described in detail below.

Figure 1:
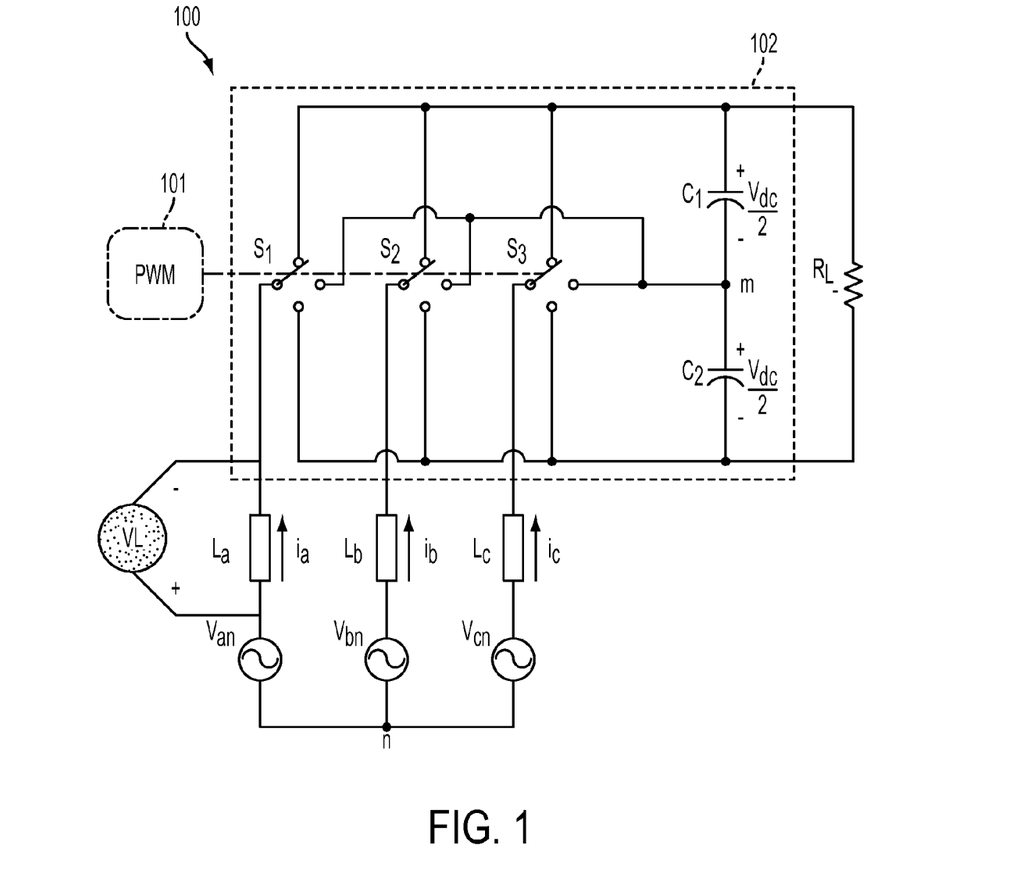
FIG. 1 illustrates a three-level active rectification system, according to an example embodiment.

FIG. 1 illustrates a three-level active rectification system, according to an example embodiment. The system 100 may include a PWM control portion 101. The PWM control portion 101 may be a computer processor or processing apparatus configured and disposed to control an active rectifier 102 of the system 100. For example, the system 100 includes active rectifier 102 in communication with the PWM control portion 101. The active rectifier 102 is a three-level active rectifier. The active rectifier 102 may include at least three switches $S_1$, $S_2$, and $S_3$. Each of the switches $S_1$, $S_2$, and $S_3$ may be configured to switch between at least three states. The at least three states may include an upper state, a center state, and a lower state. The upper, center, and lower states correspond to three-levels of active rectification of the active rectifier 102.

The active rectifier 102 may further include a first capacitance $C_1$ coupled across the upper and center states of each of the switches $S_1$, $S_2$, and $S_3$. The active rectifier 102 may further include a second capacitance $C_2$ coupled across the center and lower states of each of the switches $S_1$, $S_2$, and $S_3$. As further illustrated, the system 100 includes a load resistance $R_L$, coupled in parallel across both the first and second capacitances of active rectifier 102.

As illustrated, the PWM control portion 101 is in electrical communication with each of the switches $S_1$, $S_2$, and $S_3$. During operation, the PWM control portion 101 may direct each of the switches $S_1$, $S_2$, and $S_3$ to change between one of the upper, center, and lower states available to the switches $S_1$, $S_2$, and $S_3$.

As further illustrated, the system 100 may further include boost inductors $L_a$, $L_b$, and $L_c$; each corresponding to a single phase of three-phase AC input current/power source ($V_{an}$, $V_{bn}$, and $V_{cn}$). Boost inductor voltage VL is equivalent to a voltage across each of the boost inductors $L_a$, $L_b$, and $L_c$.

As described above, it may be desirable to reduce the boost inductor voltage VL thereby reducing the size and bulk of the boost inductors of the system 100. Furthermore, a reduction in a boost inductor voltage VL generally results in desirable decreases to AC input current ripples, thereby providing additional benefits.

According to example embodiments, reduction in the boost inductor voltage and AC input current ripples may be achieved through PWM schemes as detailed below.

Figure 2:
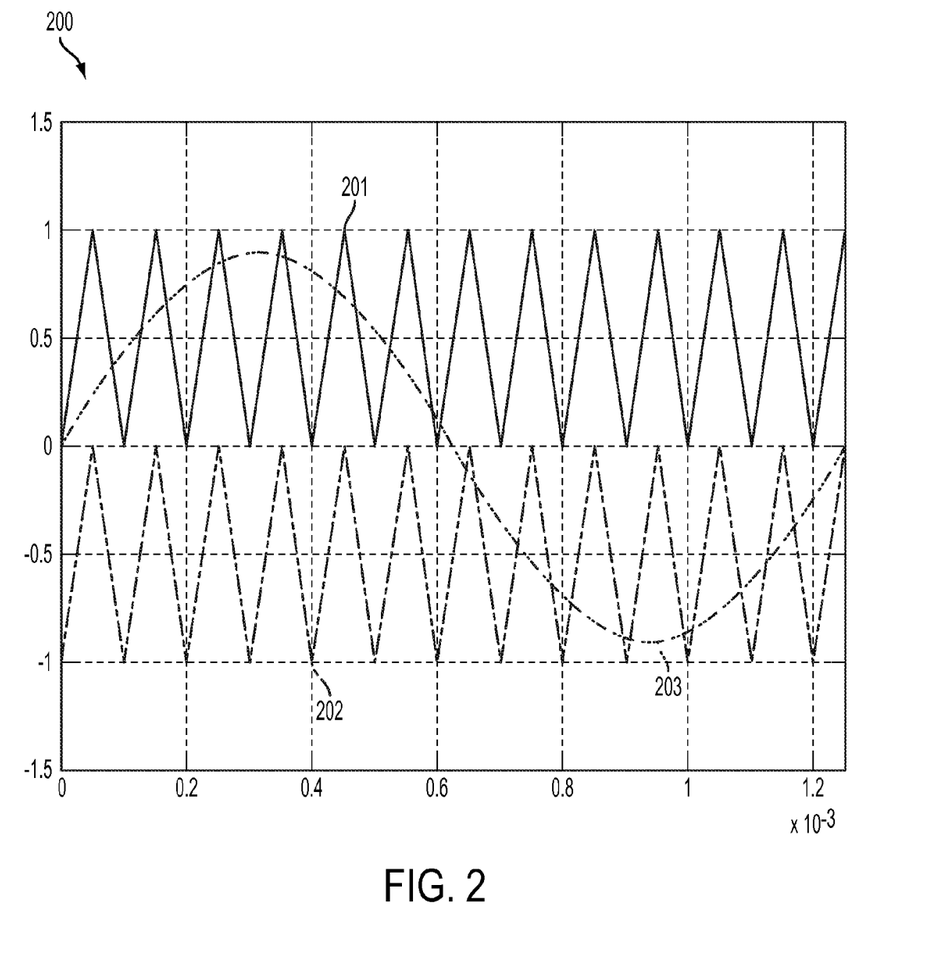
FIG. 2 depicts a graph of carrier signals generated through a Phase Disposition (PD) PWM scheme.

FIG. 2 depicts a graph of carrier signals generated through a Phase Disposition (PD) PWM scheme. As illustrated, upper carrier signal 201 is a triangular waveform configured and disposed to change switch states of an active rectifier between an upper state and a center state in response to a comparison with reference voltage 203. Lower carrier signal 202 is a triangular waveform configured and disposed to change switch states of an active rectifier between a center and a lower state in response to a comparison with the reference voltage 203. Carrier signals 201 and 202 are in phase, thereby facilitating a PD PWM scheme.

Figure 3:
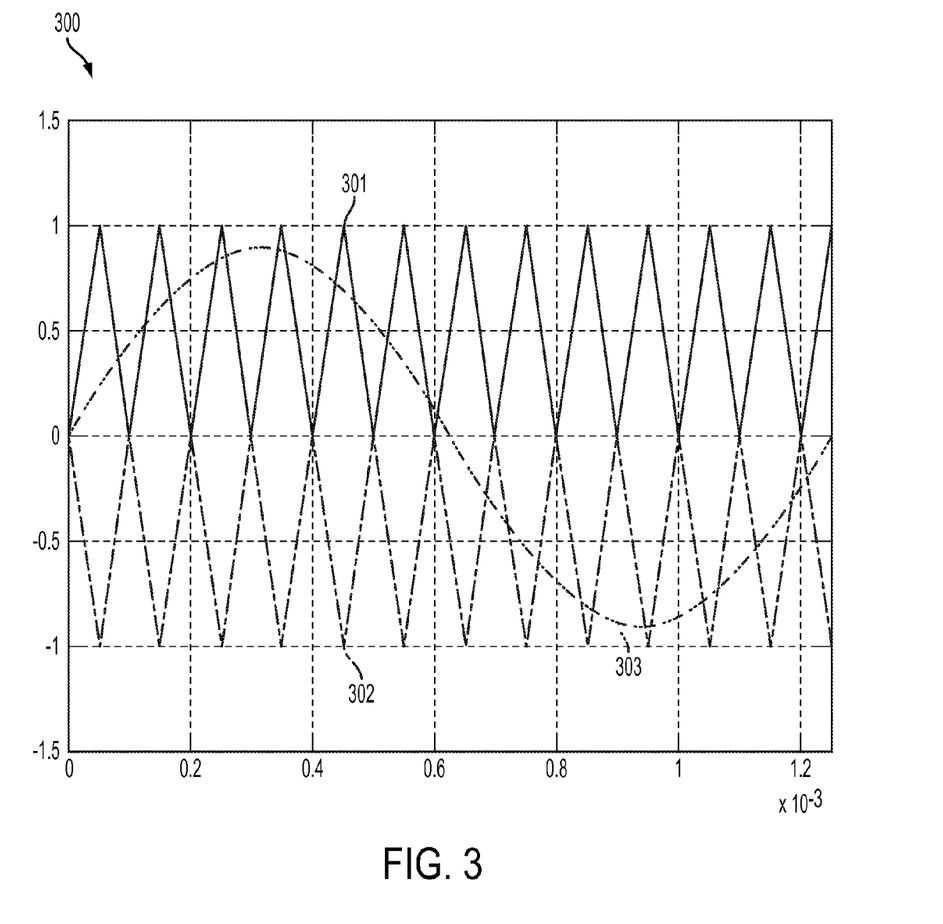
FIG. 3 depicts a graph of carrier signals generated through a Phase Opposition Disposition (POD) PWM scheme.

FIG. 3 depicts a graph of carrier signals generated through a Phase Opposition Disposition (POD) PWM scheme. As illustrated, upper carrier signal 301 is a triangular waveform configured and disposed to change switch states of an active rectifier between an upper state and a center state in response to a comparison with reference voltage 303. Lower carrier signal 302 is a triangular waveform configured and disposed to change switch states of an active rectifier between a center and a lower state in response to a comparison with the reference voltage 303. Carrier signals 301 and 302 are 180 degrees out of phase.

Figure 4:
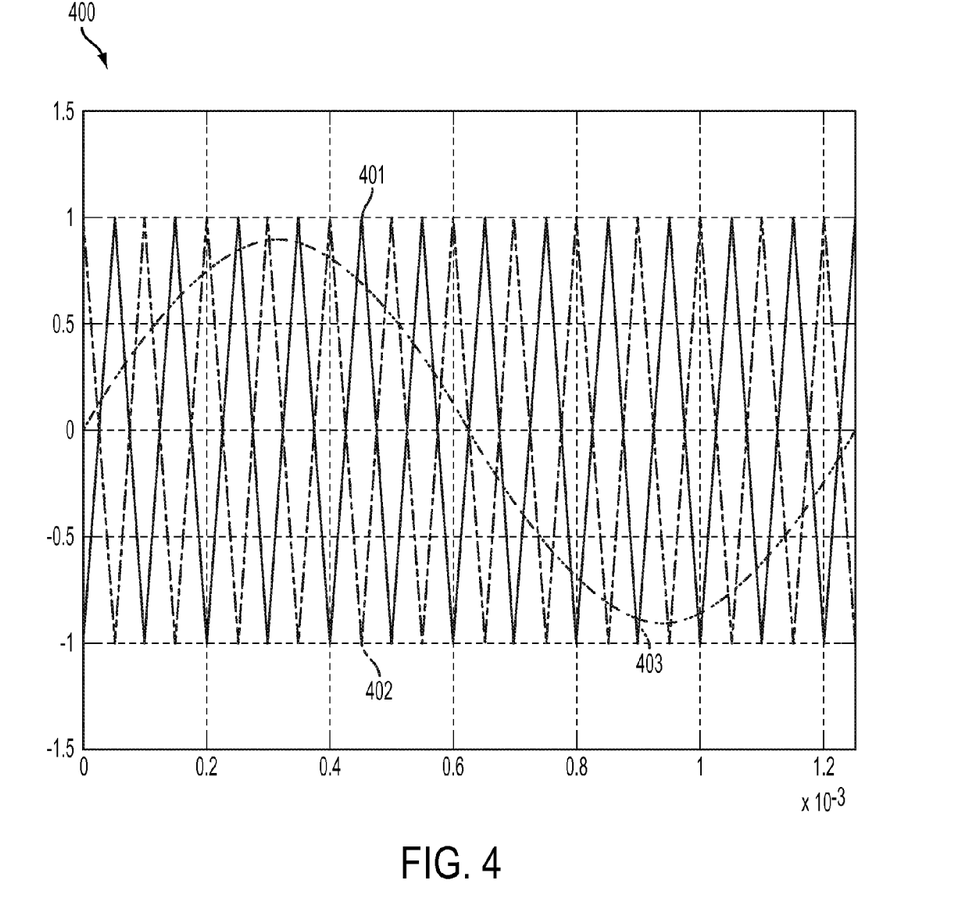
FIG. 4 depicts a graph of carrier signals generated through a Phase Shift (PS) PWM scheme.

FIG. 4 depicts a graph of carrier signals generated through a Phase Shift (PS) PWM scheme. As illustrated, upper carrier signal 401 is a triangular waveform configured and disposed to change switch states of an active rectifier between an upper state, a center state, and a lower state in response to a comparison with reference voltage 403. Lower carrier signal 402 is a triangular waveform configured and disposed to change switch states of an active rectifier between an upper state, a center state, and a lower state in response to a comparison with the reference voltage 403. Carrier signals 401 and 402 are 180 degrees out of phase.

According to example embodiments, PD PWM schemes (graph 200) tailored to a three-level active rectification system (e.g., system 100) may result in decreased boost inductor voltage as compared to graphs 300 and 400. Hereinafter, a method of three-level active rectification PWM control, including a PD PWM scheme, is discussed in detail.

Figure 5:
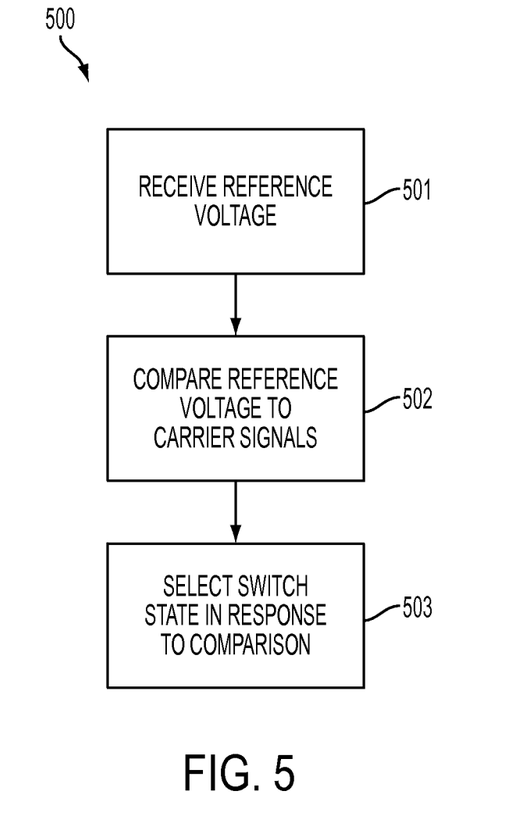
FIG. 5 illustrates a method of three-level active rectification PWM control, according to an example embodiment.

FIG. 5 illustrates a method of three-level active rectification PWM control, according to an example embodiment. The method 500 includes receiving a reference voltage at block 501. For example, the reference voltage may be a voltage referencing a state of a three-level active rectifier. The reference voltage may be received and/or interpreted at a PWM control portion of an active rectification system, such as PWM control portion 101 of system 100.

The method 500 further includes comparing the reference voltage to upper and lower carrier signals of a PD PWM scheme at block 502. The upper and lower carrier signals may be similar to those signals graphed in FIG. 2. The upper and lower carrier signals may be generated at a PWM control portion (e.g., PWM control portion 101 of FIG. 1) of an active rectification system (e.g., system 100).

The method 500 further includes selecting a switch state of a three-level active rectifier in response to the comparison at block 503. For example, the switch state may be a state of at least three switches of a three-level active rectifier (e.g., switches $S_1$, $S_2$, and $S_3$, of FIG. 1). The switch state may be an upper state, a center state, or a lower state.

For example, selecting the switch state may include selecting an upper switch state for the at least three switches of a three-level active rectifier if a reference voltage is greater than both an upper carrier signal and a lower carrier signal.

Selecting the switch state may include selecting a center switch state for the at least three switches of a three-level active rectifier if an upper carrier signal is less than a reference voltage, and a lower carrier signal is greater than a reference voltage.

Finally, selecting the switch state may include selecting a lower switch state for the at least three switches of a three-level active rectifier if a reference voltage is less than both an upper carrier signal and a lower carrier signal.

Selecting switch states as described above may result in decreased boost inductor voltages (e.g., voltage VL of FIG. 1) of an active rectification system and decreased AC input current ripples. For example, graphs depicting experimental results of the method 500 in comparison to POD/PS PWM schemes are described below.

Figure 6:
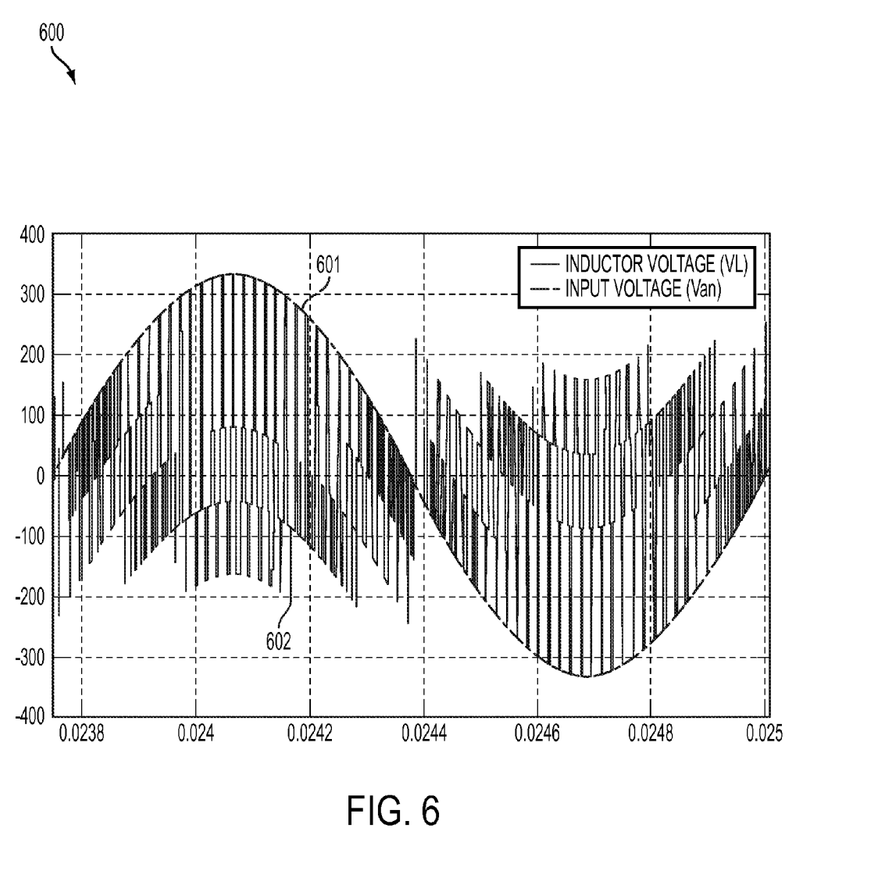
FIG. 6 depicts a graph of boost inductor voltage generated through a POD/PS PWM scheme.

FIG. 6 depicts a graph of boost inductor voltage generated through a POD/PS PWM scheme. As illustrated, a boost inductor voltage 602 is relatively large compared to an input voltage 601 of an active rectification system, when using a POD/PS PWM scheme. In comparison, a PD PWM scheme may result in decreased boost inductor voltage.

Figure 7:
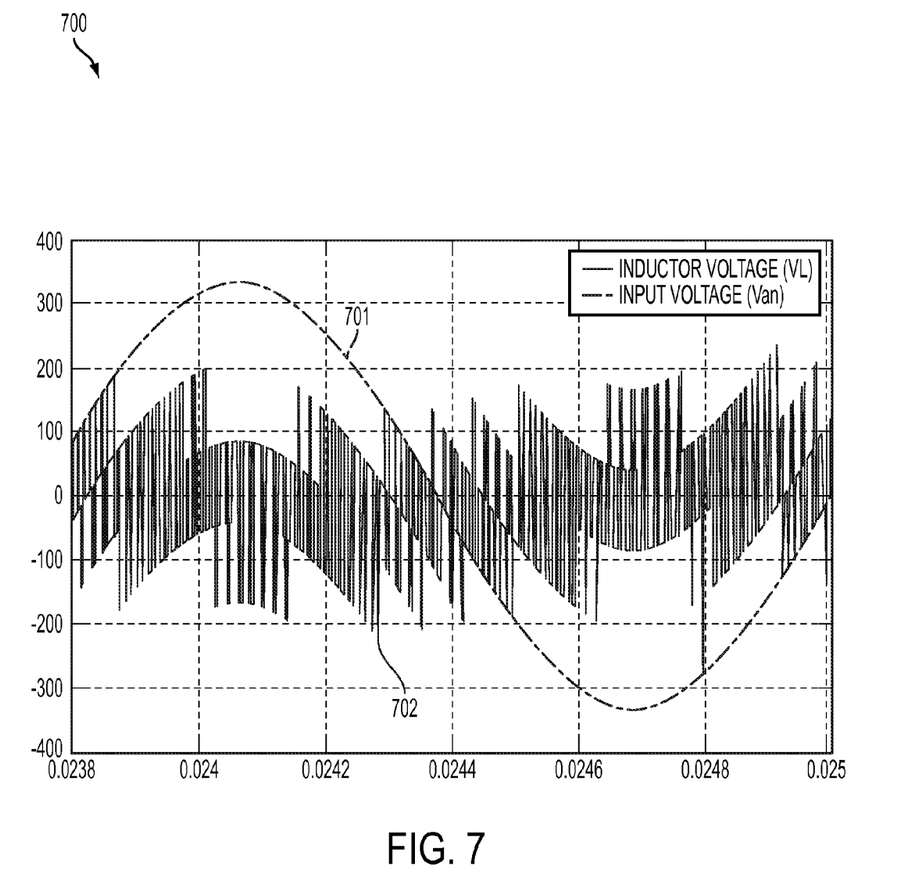
FIG. 7 depicts a graph of boost inductor voltage generated through a PD PWM scheme.

For example, FIG. 7 depicts a graph of boost inductor voltage generated through a PD PWM scheme. As illustrated, a boost inductor voltage 702 is relatively decreased as compared to boost inductor voltage 602, compared to an input voltage 701 of an active rectification system, when using a PD PWM scheme according to the method 500. Further benefits including reduced AC input current ripple are depicted in FIG. 8.

Figure 8:
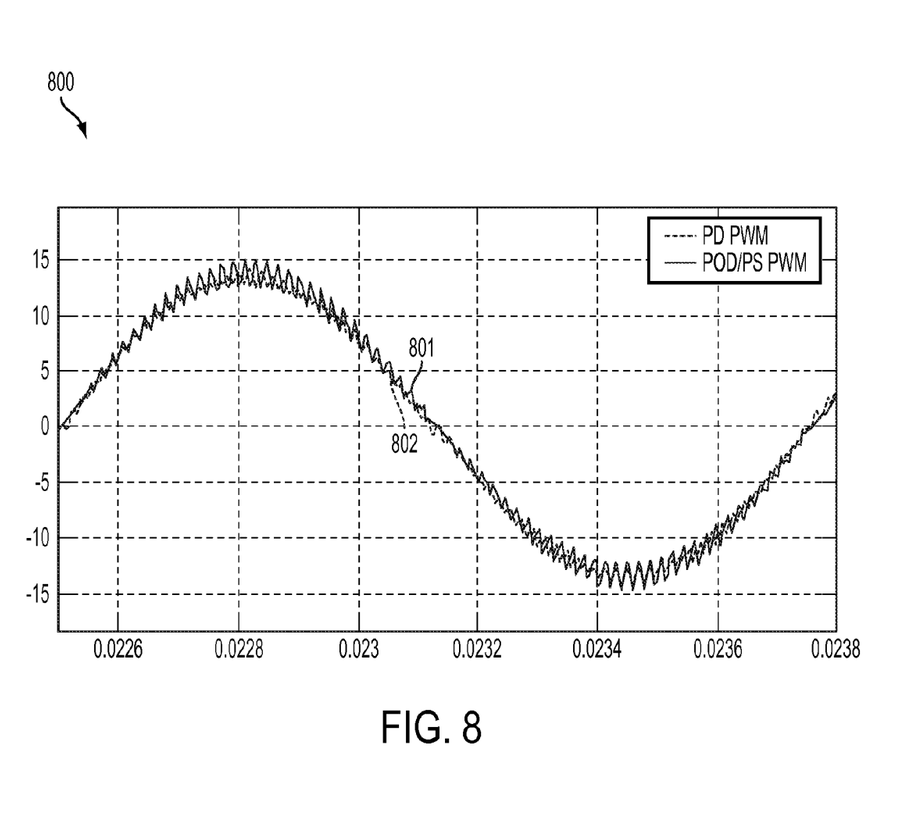
FIG. 8 depicts a graph of Alternating Current (AC) input current ripple for PD and POD/PS PWM schemes.

FIG. 8 depicts a graph of Alternating Current (AC) input current ripple for PD and POD/PS PWM schemes. As illustrated, AC input current ripple 801 is an AC input current ripple in an active rectification system based on a POD/PS PWM scheme. AC input current ripple 801 is an AC input current ripple in an active rectification system based on the method 500. As shown, the AC input current ripple 802 is relatively smaller than the AC input current ripple 801.

As provided and described in detail above, example embodiments of the present invention provide beneficial decreases in boost inductor voltages and AC input current ripple of active rectification systems. The technical effects of example embodiments include the decreased boost inductor size and bulk, thereby reducing a weight of an active rectification system.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An active rectification system, comprising:
    a three-level active rectifier, the three-level active rectifier including at least three switches, the at least three switches having one input and three outputs and being selectively switchable between an upper state that connects the input to a first of the three output, a center state that connects the input to a second of the three output, and a lower state that connects the input to a third of the three output;
    a pulse width modulation (PWM) control portion in communication with the at least three switches, the PWM control portion is configured and disposed to create an upper carrier signal and a lower carrier signal, and the PWM control portion is configured and disposed to selectively switch the at least three switches between the upper state, the center state, and the lower state in response to a phase disposition of the upper carrier signal and the lower carrier signal; and
    a three phase power source coupled to the three-level rectifier.

2. The system of claim 1, wherein the three-level active rectifier further includes a first capacitance coupled across the upper state and the center state of each of the at least three switches.

3. The system of claim 2, wherein the three-level active rectifier further includes a second capacitance coupled across the center state and the lower state of each of the at least three switches.

4. The system of claim 3, further comprising a load in communication with the first capacitance and the second capacitance.

5. The system of claim 1, further comprising:
a first boost inductor in communication with a first switch of the at least three switches;
a second boost inductor in communication with a second switch of the at least three switches; and
a third boost inductor in communication with a third switch of the at least three switches.

6. The system of claim 5, wherein the three phase power source is in communication with the first boost inductor, the second boost inductor, and the third boost inductor.

7. A method of three-level active rectification pulse width modulation (PWM) control, comprising:
receiving a reference voltage;
comparing the reference voltage to a phase disposition of an upper carrier signal and a lower carrier signal of a PWM scheme, the upper and lower carrier signals being in phase; and
selecting between at least three switch states of a three-level active rectifier in response to the comparison.

8. The method of claim 7, wherein the reference voltage is received from the three-level active rectifier.

9. The method of claim 7, further comprising generating the upper carrier signal and the lower carrier signal at a PWM control portion of an active rectification system.

10. The method of claim 7, wherein the at least three switch states include an upper state, a center state, and a lower state.

11. The method of claim 10, wherein selecting between the at least three switch states includes selecting the upper state if the reference voltage is greater than both the upper carrier signal and the lower carrier signal.

12. The method of claim 10, wherein selecting between the at least three switch states includes selecting the center state if the upper carrier signal is less than the reference voltage and the reference voltage is greater than the lower carrier signal.

13. The method of claim 10, wherein selecting between the at least three switch states includes selecting the lower switch state if the reference voltage is less than the upper carrier signal and the lower carrier signal.

14. The method of claim 10, wherein selecting between the at least three switch states includes:
selecting the upper state if the reference voltage is greater than both the upper carrier signal and the lower carrier signal;
selecting the center state if the upper carrier signal is less than the reference voltage and the reference voltage is greater than the lower carrier signal; and
selecting the lower switch state if the reference voltage is less than the upper carrier signal and the lower carrier signal.

15. The method of claim 7, wherein the upper carrier signal is a triangular carrier signal.

16. The method of claim 7, wherein the lower carrier signal is a triangular carrier signal.

17. The method of claim 7, wherein the PWM scheme is a phase disposition PWM scheme.

18. The method of claim 7, wherein the PWM scheme is a phase opposition disposition PWM scheme.

19. The method of claim 7, wherein the PWM scheme is a phase shift PWM scheme.

* * * * *